United States Patent
Matsunaga et al.

(10) Patent No.: US 7,220,696 B2
(45) Date of Patent: May 22, 2007

(54) SOLID TITANIUM CATALYST COMPONENT FOR OLEFIN POLYMERIZATION, CATALYST FOR OLEFIN POLYMERIZATION, AND PROCESS FOR OLEFIN POLYMERIZATION

(75) Inventors: Kazuhisa Matsunaga, Sodegaura (JP); Masao Nagano, Sodegaura (JP); Masaaki Ohgizawa, Sodegaura (JP); Toshiyuki Tsutsui, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 237 days.

(21) Appl. No.: 10/501,888

(22) PCT Filed: Apr. 3, 2003

(86) PCT No.: PCT/JP03/04288

§ 371 (c)(1),
(2), (4) Date: Jul. 20, 2004

(87) PCT Pub. No.: WO03/085006

PCT Pub. Date: Oct. 16, 2003

(65) Prior Publication Data

US 2004/0259721 A1 Dec. 23, 2004

(30) Foreign Application Priority Data

Apr. 4, 2002 (JP) ............................. 2002-102694
Apr. 4, 2002 (JP) ............................. 2002-102701

(51) Int. Cl.
*B01J 31/00* (2006.01)

(52) U.S. Cl. .................... 502/126; 502/104; 502/110; 502/129; 502/132; 502/133; 502/134; 502/169; 502/172; 526/124.9

(58) Field of Classification Search ................ 502/104, 502/110, 126, 129, 132–134, 169, 172, 159; 526/124.9
See application file for complete search history.

(56) References Cited

FOREIGN PATENT DOCUMENTS

| EP | 0585869 A | 3/1994 |
|---|---|---|
| JP | 62-50308 A | 3/1987 |
| JP | 3-294310 A | 12/1991 |
| JP | 6-279525 A | 10/1994 |
| JP | 6-279526 A | 10/1994 |

*Primary Examiner*—Elizabeth D. Wood
(74) *Attorney, Agent, or Firm*—Birch, Stewart, Kolasch & Birch, LLP

(57) ABSTRACT

Disclosed is a catalyst for olefin polymerization comprising [I] a solid titanium catalyst component [S] comprising titanium, magnesium, halogen and an electron donor (b), which is obtained by bringing a solid adduct consisting of a magnesium compound and an electron donor (a) into contact with an electron donor (b) and a liquid titanium compound by at least one method selected from (A) a method of contacting the materials in a suspended state in the coexistence of an inert hydrocarbon solvent and (B) a method of contacting the material plural times individed portions and [II] an organometallic compound catalyst component [M] containing a metal selected from the groups I to III in the periodic table.

8 Claims, No Drawings

SOLID TITANIUM CATALYST COMPONENT FOR OLEFIN POLYMERIZATION, CATALYST FOR OLEFIN POLYMERIZATION, AND PROCESS FOR OLEFIN POLYMERIZATION

TECHNICAL FIELD

The present invention relates to a solid catalyst component, a catalyst and a polymerization process for producing a homopolymer or copolymer of ethylene and an α-olefin.

BACKGROUND ART

A catalyst comprising a titanium compound carried on a magnesium halide in, an active state, is known as a catalyst for use in the production of olefin polymers such as a homopolymer of ethylene or an α-olefin and an ethylene/α-olefin copolymer.

As the catalyst for olefin polymerization (hereinafter, "the catalyst for polymerization" is used sometimes to encompass "catalyst for copolymerization"), a solid-titanium catalyst component comprising magnesium, titanium, halogen, and an electron donor, and an organometallic compound is known.

This catalyst has a high activity, in polymerization or copolymerization of α-olefins such as propylene, and butene-1, similar to polymerization of ethylene (hereinafter, "polymerization" is used sometimes to encompass "copolymerization"), and the stereospecificity of the resulting polymer (hereinafter, "polymer" is used sometimes to encompass "copolymer".) is also high.

Among these catalysts, a catalyst using a solid titanium catalyst component having an electron donor selected from carboxylates typically phthalates carried there on, an aluminum-alkyl compound as a catalyst component, and a silicon compound having at least one Si—OR bond (R is a hydrocarbon group) is known to exhibit excellent performance.

The present inventors have made investigations for the purpose of obtaining a catalyst for olefin polymerization more excellent in polymerization activity and stereoregularity, and as a result, they found that this object can be achieved by a catalyst using a specific solid titanium catalyst component having magnesium, halogen, titanium and an electron donor (b), and an organometallic compound, or by a catalyst comprising a specific solid titanium catalyst component comprising magnesium, titanium, halogen and an electron donor (b), an organometallic compound, and, an electron donor (c).

DISCLOSURE OF INVENTION

The present invention was made under these circumstances, and the object of the present invention is to provide a solid titanium catalyst component for olefin polymerization obtained by using a specific electron donor by a specific preparation method, as well as an olefin (co)polymer having high stereospecificity with a high catalytic activity by (co)polymerization reaction of olefins by using the solid titanium catalyst component.

The solid titanium catalyst component [S] for olefin polymerization according to the present invention comprising titanium, magnesium, halogen and an electron donor (b) is obtained by bringing a solid adduct consisting of a magnesium compound and an electron donor (a) into contact with an electron donor (b) and a liquid titanium compound. This is accomplished either by (A) a method of contacting the materials in a suspended state in the coexistence of an inert hydrocarbon solvent or by (B) a method of contacting the materials plural times in divided portions.

In the solid titanium catalyst component for olefin polymerization according to the present invention, a compound having two or more ether linkages can be used as the electron donor (b) to obtain a catalyst for olefin polymerization that can produce a polymer having high stereospecificity with sufficiently high activity without further, using an electron donor in preparing the polymerization catalyst When the particle diameter of the solid titanium catalyst component for olefin polymerization according to the present invention, is in the range of 30 to 150 μm a problem with fluidity of particles causing a hindrance in operation by adhesion of the particles, to a polymerizer in producing block copolymers can be reduced.

The catalyst for olefin polymerization according to the present invention comprises a solid titanium catalyst component [S] containing titanium, magnesium, halogen and an electron donor (b), and an organic metal compound catalyst component [M] containing a metal selected from the groups I to III in the periodic table, the solid titanium catalyst component [S] being obtained by bringing a solid adduct consisting of a magnesium compound and an electron donor (a) into contact with an electron donor (b) and a liquid titanium compound. This may be accomplished either by (A) a method of contacting the materials in a suspended state in the coexistence of an inert hydrocarbon solvent or by (B) a method of contacting the materials plural times in divided portions.

The process for olefin polymerization according to the present invention comprises polymerizing or copolymerizing at least one olefin selected from ethylene and $C_{3-20}$ α-olefins by using the catalyst for olefin polymerization described above.

In the catalyst for olefin polymerization and the process for olefin polymerization according to the present invention, the organometallic compound catalyst component [M] can be used together with the solid titanium catalyst component [S] in the present invention to carry out the polymerization reaction efficiently with a high catalytic activity to give a polymer having high stereospecificity.

In the catalyst for olefin polymerization and the process for olefin polymerization according to the present invention, the catalyst comprising a specific electron donor (c) can be used in addition to the two components, that is, the solid titanium catalyst component [S] and the organometallic compound catalyst component [M] to give a polymer having further higher stereoregularity.

BEST MODE FOR CARRYING OUT THE INVENTION

Hereinafter, the solid catalyst component for olefin polymerization, the catalyst for olefin polymerization, and the process for olefin polymerization according the present invention are described in detail.

The solid titanium catalyst component [S] for olefin polymerization according to the present invention is obtained by bringing a solid adduct consisting of a magnesium compound and an electron donor (a) into contact with an electron donor (b) and a liquid titanium compound by at least one method selected from (A) a method of contacting the materials in a suspended state in the coexistence of an inert hydrocarbon solvent and (B) a method of contacting the materials plural times in divided portions.

That is, the solid titanium catalyst component [S] for olefin polymerization according to the present invention is classified into the solid titanium catalyst component [S1] to [S3], depending on the methods (P-1) to (P-3), of contacting the electron donor (b) with a liquid titanium compound.

The solid titanium catalyst component, [S1] obtained by the method. (P-1) of bringing a solid adduct consisting of a magnesium compound and the electron donor (a) into contact with the electron donor (b) and a liquid titanium compound by a method (A) of contacting the materials in a suspended state in the coexistence of an inert hydrocarbon solvent.

The solid titanium catalyst component [S2] obtained by the method (P-2) of bringing a solid adduct consisting of a magnesium compound and the electron donor (a) into contact with the electron donor (b) and a liquid titanium compound by a method (B) of contacting the materials plural times in divided portions.

The solid titanium catalyst component [S3] obtained by the method (P-3) of bringing a solid adduct consisting of a magnesium compound and the electron donor (a) into contact with the electron donor (b) and a liquid titanium compound by a method (A) and (B) of contacting the materials in a suspended state in the coexistence of an inert hydrocarbon solvent and contacting the materials plural times in divided portions.

The catalyst for olefin polymerization according to the present invention comprises the solid titanium catalyst component [S] mentioned above.

Hereinafter, the magnesium compound as a starting material of the solid adduct and the electron donor (a) in the present invention are described, and then the method of preparing the solid adduct, and the solid adduct thus obtained are described.

Then, the titanium compound as a starting material of the solid titanium catalyst component [S] and the electron donor (b) will be described. As the electron donor (b), an electron donor (b1) and an electron donor (b2) will be described respectively.

Then, the insert hydrocarbon solvent used in preparation of the solid titanium catalyst component [S1], the method of preparing the solid titanium catalyst component [S1], and the method of contacting the materials plural times individed portions to produce the solid titanium catalyst component [S2] will be described.

Then, the organometallic compound catalyst component [M] will be described, and finally the process for olefin polymerization by using the catalyst for olefin polymerization according to the present invention, and the electron donor (c) used if necessary in the polymerization, will be described.

[Magnesium Compound]

The solid adduct used in preparation of the solid titanium catalyst component [S] used in the present invention is formed from a magnesium compound and the electron donor (a), and the magnesium compound includes, for example, magnesium halides such as magnesium chloride, magnesium bromide, magnesium iodide and magnesium fluoride; alkoxymagnesium halides such as methoxymagnesium chloride and ethoxymagnesium chloride; aryloxymagnesium halides such as phenoxymagnesium chloride; alkoxymagnesium such as ethoxymagnesium, isopropoxymagnesium, butoxymagnesium and 2-ethylhexoxymagnesium; aryloxymagnesium such as phenoxymagnesium; and magnesium carboxylates such as magnesium laurate and magnesium stearate.

These magnesium compounds maybe used alone or in combination thereof. These magnesium compounds maybe used as a complex or a binuclear complex with another metal or a mixture with another metal compound.

Among, these, magnesium halides, particularly magnesium chloride, are, preferably used. The magnesium compound may be derived from another material.

[Electron Donor (a)]

As the electron donor (a), a compound having an ability to solubilize the magnesium compound is used. The compound having an ability to solubilize the magnesium compound is preferably an alcohol, an aldehyde, an amine, a carboxylic acid or a mixture thereof.

The alcohol having an ability to solubilize the magnesium compound includes, for example, aliphatic alcohols such as methanol, ethanol, propanol, butanol, ethylene glycol, methylcarbitol, 2-methylpentanol, 2-ethylbutanol, n-heptanol, n-octanol, 2-ethylhexanol, decanol and dodecanol, alicyclic alcohols such as cyclohexanol and methylcyclohexanol, aromatic alcohols such as benzyl alcohol and methylbenzyl alcohol, and aliphatic alcohols containing an alkoxy group, such as n-butyl cellosolve.

The carboxylic acid includes C7 or more organic carboxylic acids such as caprylic acid and 2-ethylhexanoic acid. The aldehyde includes C7 or more aldehydes such as capric aldehyde and 2-ethylhexyl aldehyde.

The amine includes C6 or more amines such as heptyl amine, octyl amine, nonyl amine, lauryl amine and 2-ethylhexyl amine. The electron donor (a) is preferably an alcohol, particularly preferably ethanol, propanol or butanol.

[Method of Preparing the Solid Adduct]

The solid adduct used in preparing the solid titanium catalyst component [S] can be prepared by contacting the magnesium compound with the electron donor (a). The solid adduct is preferably a complex prepared by contacting magnesium chloride with an alcohol.

In preparing the solid adduct, the amounts of the magnesium compound and the electron donor (a) used are varied depending on their type and contact conditions, but usually the magnesium compound is used in an amount of 0.1 to 20 moles/L, preferably 0.5 to 5 moles/L per unit volume of the electron donor (a).

[Titanium Compound]

The liquid titanium compound used in preparing the solid titanium catalyst component [S] in the present invention includes tetravalent titanium compounds represented by the formula:

$$Ti(OR)_gX_{4-g}$$

wherein R is a hydrocarbon group, X is a halogen atom, and g satisfies the relationship of $0 \leq g \leq 4$. Particular examples of such titanium compounds include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_4H_9)Br_3$; alkoxytitanium dihalides such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$; alkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$.

Preferable among these is titanium tetrahalide, particularly preferably titanium tetrachloride. These titanium compounds may be used alone or in the form of a mixture thereof.

[Electron Donor (b)]

In the solid titanium catalyst component [S] according to the present invention, the electron donor (b) is used in addition to the above-described compound. The electron donor (b) which can be used in the present invention includes the electron donor (b1) having two or more ether linkages via a plurality of atoms and the other electron donor (b,2), and in the present invention, the electron donor (b1) is used preferably for the reason of higher polymerization activity. Hereinafter, the electron donors (b1) and (b2) are described.

[Electron Donor (b1)]

The electron donor (b1) having two or more ether linkages via a plurality of atoms is a compound having a plurality of atoms between at least two ether (C—O—C) linkages, that is, between C—O—C and C—O—C. Specifically, the compound (b1) is a compound wherein at least two ether (C—O—C) linkages are linked via a plurality of atoms that are carbon, silicon, oxygen, sulfur, phosphorus or boron atoms or two or more kinds of atoms selected therefrom.

The atoms linking these ether linkages can have one or more substituent(s) containing at least one element selected from carbon, hydrogen, oxygen, halogen, nitrogen, sulfur, phosphorus, boron and silicon. The compound is preferably a compound wherein one or two relatively highly bulky substituent(s) is (are) bound to an atom between ether linkages, and the atoms linking the ether linkages contain a plurality of carbon atoms.

The compound having two or more ether linkages includes, for example, compounds represented by the formula (1):

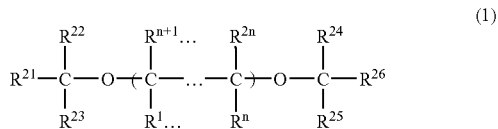

(1)

wherein n is an integer satisfying the relationship of $2 \leq n \leq 10$, and each of $R^1$ to $R^{26}$ is a substituent having at least one element selected from carbon, hydrogen, oxygen, halogen, nitrogen, sulfur, phosphorus, boron and silicon, and arbitrary groups in $R^1$ to $R^{26}$, preferably $R^1$ to $R^{2n}$, may be combined together to form a ring other than a benzene ring, and the main chain may contain atoms other than carbon.

The compound having two or more ether linkages described above includes, for example:
2-(2-ethylhexyl)-1,3-dimethoxypropane,
2-isopropyl-1,3-dimethoxypropane,
2-butyl-1,3-dimethoxypropane,
2-s-butyl-1,3-dimethoxypropane,
2-cyclohexyl-1,3-dimethoxypropane,
2-phenyl-1,3-dimethoxypropane,
2-cumyl-1,3-dimethoxypropane,
2-isopropyl-2-isobutyl-1,3-dimethoxypropane,
2-(2-phenylethyl)-1,3-dimethoxypropane,
2-(2-cyclohexylethyl)-1,3-dimethoxypropane,
2,2-dicylohexyl-1,3-dimethoxypropane,
2,2-diethyl-1,3-dimethoxypropane,
2,2-dipropyl-1,3-dimethoxypropane,
2,2-dibutyl-1,3-dimethoxypropane,
2-methyl-2-propyl-1,3-dimethoxypropane,
2-methyl-2-benzyl-1,3-dimethoxypropane,
2-methyl-2-ethyl-1,3-dimethoxypropane,
2-methyl-2-isopropyl-1,3-dimethoxypropane,
2-methyl-2-phenyl-1,3-dimethoxypropane,
2-methyl-2-cyclohexyl-1,3-dimethoxypropane,
2-methyl-2-isobutyl-1,3-dimethoxypropane,
2,2-diisobutyl-1,3-dimethoxypropane,
2,2-diphenyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-cyclohexyl-2-cyclohexylmethyl-1,3-dimethoxypropane,
2,3-diphenyl-1,4-diethoxybutane,
2,3-dicyclohexyl-1,4-diethoxybutane,
2,3-dicyclohexyl-1,4-diethoxybutane,
2,3-diisopropyl-1,4-diethoxybutane,
2,4-diphenyl-1,5-dimethoxypenhtane,
2,5-diphenyl-1,5-dimethoxyhexane,
2,4-diisopropyl-1,5-dimethoxypentane,
2,4-diisobutyl-1,5-dimethoxypentane,
2,4-diisoamyl-1,5-dimethoxypentane,
1,2-diisobutoxypropane,
1,2-diisobutoxyethane,
1,3-diisoamyloxyethane,
1,3-diisoamyloxypropane,
1,3-diisoneopentyloxyethane,
1,3-dineopentyloxypropane,
1,2-bis(methoxymethyl)cyclohexane,
3,3-diisobutyl-1,5-oxononane,
6,6-dibutyldioxyheptane,
1,1-dimethoxymethylcyclopentane,
2-methyl-2-methoxymethyl-1,3-dimethoxypropane,
2-cyclohexyl-2-ethoxymethyl-1,3-diethoxypropane,
2-cyclohexyl-2-methoxymethyl-1,3-dimethoxyprdpane,
2,2-diisobutyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-dimethoxycyclohexane,
2-isopropyl-2-ethoxymethyl-1,3-dimethoxycyclohexane,
2-isobutyl-2-ethoxymethyl-1,3-dimethoxycyclohexane,
diphenylbis(methoxymethyl)silane,
di-t-butylbis(methoxymethyl)silane, and
cyclohexyl-t-butylbis(methoxymethyl)silane.

Preferable among these compounds are 1,3-diethers, particularly 2-isopropyl-2-isobutyl-1,3-dimethoxypropane, 2,2-diisobutyl-1,3-dimethoxypropane, 2-isopropyl-2-7isopentyl-1,3-dimethoxypropane, 2,2-dicyclohexyl-1,3-dimethoxypropane and 2,2-bis-(cyclohexylmethyl)-1,3-dimethoxypropane.

[Electron Donor (b2)]

The solid titanium catalyst component [S] contained in the olefin polymerization catalyst of the present invention may be prepared from the electron donor (b2) in place of the electron donor (b1) having two or more ether linkages. The electron donor (b2) includes, for example, organic esters and organic acid anhydrides described in EP585869A1 filed by the present applicant.

The electron donor (b2) used is preferably a carboxylate, more preferably a polyvalent carboxylate, and still more preferably a phthalate.

As described above, the electron donor (b) used in the present invention is preferably the compound (b1) having two or more ether linkages via a plurality of atoms, more preferably a compound represented by the formula (1) above, particularly preferably 1,3-diethers. Particularly preferable forms of such 1,3-diethers are described above. At the time of preparation of the solid titanium catalyst component, a mixture of the electron donors (b1) and (b2) can also be used as the electron donor (b).

[Preparation of the Solid Titanium Catalyst Component [S1]]

The solid titanium catalyst component [S1] according to the present invention is prepared by bringing the solid adduct into contact with the electron donor (b) and the liquid titanium compound in the coexistence of an inert hydrocarbon solvent.

Hereinafter, several examples of preparation of the solid titanium catalyst component [S1] (also referred to hereinafter as "solid titanium complex") are described, but the present invention is not limited to such methods.

(P-a) The solid titanium complex is obtained by bringing the solid adduct into contact with the electron donor (b) in the coexistence of an inert hydrocarbon solvent, and then bringing the liquid titanium compound into contact with the resulting product.

(P-b) The solid titanium complex is obtained by bringing the solid adduct into contact with the liquid titanium compound in the coexistence of an inert hydrocarbon solvent, and then brining the electron donor (b) into contact with the resulting product.

(P-c) The solid titanium complex is obtained by bringing the solid adduct into contact with the electron donor (b) and a halogen-containing compound and/or an organometallic compound in the coexistence of an inert hydrocarbon solvent, and then bringing the liquid titanium compound into contact with the resulting product.

(P-d) The solid titanium complex is obtained by bringing the solid adduct into contact with the liquid titanium compound in the coexistence of an inert hydrocarbon solvent, and then brining the electron donor (b) and a halogen containing compound and/or an organometallic compound into contact with the resulting product.

The liquid titanium compound may be further contacted with the solid titanium catalyst component [S1] obtained in the methods (P-a) to (P-d) described above.

The inert hydrocarbon solvent includes, for example, aliphatic hydrocarbons such as propane, butane, pentane hexane, heptane, octane, decane, dodecane and kerosine, alicyclic hydrocarbons such as cyclopentane, cyclochexane and methylcyclopentane, aromatic hydrocarbons such aszbenzene, toluene and xylene, halogenated, hydrocarbons such as ethylene chloride and chlorobenzene, or mixtures thereof.

Among these inert hydrocarbon solvents, aliphatic or aromatic hydrocarbons are used preferably, and octane, decane, toluene and xylene are used more preferably.

When the solid titanium catalyst component [S1] is prepared by these methods, the amounts of the solid adduct, the liquid titanium compound and the electron donor (b) used are varied depending on their type contacting conditions and contacting order, but preferably the electron donor (b) is used in an amount of 0.01 to 5 moles, particularly 0.1 to 1 mol, and the liquid titanium compound is used in an amount of 0.1 to 1000 moles, particularly 1 to 200 moles, per mole of magnesium in the solid adduct consisting of the magnesium compound and the electron donor (a). The inert hydrocarbon solvent is used preferably in an amount of 0.0001 to 100 moles, particularly preferably 0.0001 to 0.1 mole.

The temperature for contacting these compounds is usually −70° C. to 200° C., preferably −25° C. to 150° C.

The solid titanium catalyst component [S1] thus obtained contains titanium, magnesium and halogen and the electron donor (b).

In the solid titanium catalyst component [S1], the halogen/titanium ratio (atomic ratio) is 2 to 100, preferably 4 to 90, and when the electron donor (b1) is used as the electron donor (b), the electron donor (b1)/titanium ratio (molar ratio) is 0.01 to 100, preferably 0.2 to 10, and, the magnesium/titanium ratio (atomic ratio) is 2to 100, preferably 4 to 50. On one hand, when the electron donor (b2) is used as the electron donor (b), the electron donor (b2)/titanium ratio (molar ratio) is 0.01 to 100, preferably 0.2 to 10, and the magnesium/titanium ratio (atomic ratio) is 2 to 100, preferably 4 to 50.

[Preparation of the Solid Titanium Catalyst Component [S2]]

The solid titanium catalyst component: [S2] in the present invention is prepared by contacting the solid adduct, the electron donor (b) and the liquid titanium compound with one another plural times individed portions. As the electron donor (b), the electron donors (b1) and (b2) can be used without limitation, but the electron donor (b1), that is, the compound having two or more ether linkages via a plurality of atoms, is used preferably as the electron donor (b) in order to achieve a higher polymerization activity.

The method of preparing the solid titanium catalyst component [S2] is not particularly limited, and this method is described by reference to several examples. In the present invention, "plural times" is defined as two or more times, but in the following preparation examples (P-a') to (P-d'), the materials are contacted twice. The compound having two or more ether linkages is used as the electron donor (b)

(P-a') The solid adduct is brought into contact with the compound having two or more ether linkages and the solid titanium compound is brought into contact with the resulting product to give a solid titanium catalyst component precursor [S2'] and the solid titanium catalyst component precursor [S2'] is brought into contact again with the compound having two or more ether linkages, and the liquid titanium compound is brought into contact again with the resulting product to give the solid titanium catalyst component [S2].

(P-b') The solid adduct is brought into contact with the liquid titanium compound, and the compound having two or more ether linkages is brought into contact with the resulting product to give a solid titanium catalyst component precursor [S2'], and the solid titanium catalyst component precursor [S2'] is brought into contact again with the liquid titanium compound, and the compound having two or more ether linkages is brought into contact again with the resulting product to give the solid titanium catalyst component [S2].

(P-c') The solid adduct is brought into contact with the compound having two or more ether linkages and a halogen-containing compound and/or an organometallic compound, and the liquid titanium compound is brought into contact with the resulting product to give a solid titanium catalyst component precursor [S2'], and the solid titanium catalyst component precursor [S2'] is brought into contact again with the compound having two or more ether linkages and a halogen containing compound and/or an organometallic compound, and the liquid titanium compound is brought into contact again with the resulting product to give the solid titanium catalyst component [S2].

(P-d') The solid adduct is brought into contact with the liquid titanium compound, and the compound having two or more ether linkages and a halogen-containing compound and/or an organometallic compound brought into contact with the resulting product to give a solid titanium catalyst component precursor [S2'], and the solid titanium catalyst component precursor [S2'] is brought into contact again with the liquid titanium compound, and the compound having two or more ether linkages and a halogen-containing compound and/or an organometallic compound are brought into contact again with the resulting product to give the solid titanium catalyst component [S2].

The compound having two or more ether linkages may be further contacted with the component obtained in the above methods (P-a') to (P-d').

When the solid titanium catalyst component [S2] is prepared by these methods, the amounts of the solid adduct, the liquid titanium compound and the compound having two or more ether linkages are varied depending on their type, contacting conditions, contacting order and contacting frequency, but generally the total amount of the compound having two or more ether linkages is used in an amount of 0.01 to 5 moles, preferably 0.1 to 2.0 moles, more preferably 0.1 to 1.5 moles, per mole of magnesium in the solid adduct consisting of the magnesium compound and the electron donor (a). When the materials are contacted twice, the amount of the compound having two or more ether linkages is more preferably 0.1 to 1.0 mole in the first contact and 0.01 to 0.5. mole in the second contact. The liquid titanium compound is used in an amount of 0.1 to 1000 moles, particularly preferably 1 to 200 moles, per mole of magnesium in the solid adduct. The liquid titanium compound may be added all at once or in divided portions. Usually, the liquid titanium compound may be added at the same time when the solid adduct or the solid titanium catalyst component and the compound having two or more ether linkages are added individed portions.

The solid adduct is preferably used in a suspended state in a hydrocarbon solvent, and usually, its concentration (solid adduct)/(hydrocarbon solvent) is 1 to 1000 g/L, preferably 100 to 500 g/L. The solid titanium catalyst component thus prepared corresponds to the solid titanium catalyst component [S3] obtained by the contacting method (P-3) described above.

As the hydrocarbon solvent, the solvent used in preparation of the solid titanium catalyst component [S1] can be used. Particularly, aliphatic hydrocarbons such as octane and decane and aromatic hydrocarbon such as toluene and xylene are preferable.

In preparation of the solid titanium catalyst precursor [S2'], the temperature for contacting the solid adduct, the liquid titanium compound, and the compound having two or more ether linkages as the electron donor (b2) is usually −70° C. to 200° C., preferably −25° C. to 150° C. The solid titanium catalyst component precursor [S2'] thus obtained contains titanium, magnesium, halogen and the compound having two or more ether linkages.

The temperature at which the compound having two or more ether linkages is further reacted with the solid titanium catalyst component precursor [S2'] obtained in the manner described above is usually −70° C. to 200° C., preferably −25° C. to 150° C. The compound having two or more ether linkages is used in an amount of 0.01 to 5 moles, particularly preferably 0.1 to 1 mole and the solid titanium catalyst component [S2] thus obtained contains titanium, magnesium, halogen and the compound having two or more ether linkages.

In the solid titanium catalyst component [S2], the halogen/titanium ratio (atomic ratio) is 2 to 100, preferably 4 to 90, and the compound having two or more ether linkages titanium ratio (molar ratio) is 0.01 to 100, preferably 0.2 to 10, and the magnesium/titanium ratio (atomic ratio) is 2 to 100, preferably 4 to 50.

The particle diameter of the solid titanium catalyst components [S1] and [S2] obtained by the methods described above is 30 to 150 μm, preferably 30 to 100 μm, more preferably 30 to 80 μm. A particle diameter in this range is preferable because, for example, the fluidity of particles causing a hindrance in operation by adhesion of the particles to a polymerizer in producing block copolymers can be improved.

The olefin polymerization catalyst according to the present invention comprises the solid titanium catalyst component [S] thus obtained and an organometallic compound catalyst component [M] containing a metal selected from the groups I to III in the periodic table. Hereinafter, the organometallic compound catalyst component [M] is described in more detail.

[Organometallic Compound Catalyst Component [M]]

The organometallic compound catalyst component [M] used includes, for example, organoaluminum compounds, alkylated group I metal/aluminum complexes, and organometallic compounds of group II metals.

The organoaluminum compounds include, for example, organoaluminum compounds represented by $R^a_n AlX_{3-n}$ wherein $R^a$ is a $C_{1-12}$ hydrocarbon group, X is a halogen or hydrogen, and n is 1 to 3.

In the above formula, $R^a$ is for example an alkyl group, cycloalkyl group or aryl group, and examples thereof include a methyl group, ethyl group, n-propyl group, isopropyl group, isobutyl group, pentyl group, hexyl group, octyl group, cyclopentyl group, cyclohexyl group, phenyl group and tolyl group.

The organoaluminum compound includes the following compounds: trialkylaluminums such as trimethylaluminum, triethylaluminum, triisopropylaluminum and triisobutylaluminum; alkenylaluminums such as isoprenylaluminum; dialkylaluminum halides such as dimethylaluminum chloride and diethylaluminum chloride; alkylaluminum sesquihalides such as methylaluminum sesquichloride and ethylaluminum sesquichloride; alkylaluminum dihalides such as methylaluminum dichloride, ethylaluminum dichloride and isopropylaluminum dichloride; and alkylaluminum hydrides such as diethylaluminum hydride and diisobutylaluminum hydride.

The organoaluminum compounds used include compounds represented by $R^a_n AlY_{3-n}$ wherein $R^a$ is as defined above, Y is a $-OR^b$ group, $-OSiR^c_3$ group, $-OAlR^d_2$ group, $-NR^e_2$ group, $-SiR^f_3$ group or $-N(R^g)AlR^h_2$ group, n is 1 to 2, $R^b$, $R^c$, $R^d$ and $R^h$ are each a methyl group, ethyl group, isopropyl group, isobutyl group, cyclohexyl group, phenyl group etc., $R^e$ is hydrogen, a methyl group, ethyl group, isoptopyl group, phenyl group, trimethylsilyl group etc., and $R^f$ and $R^g$ are each a methyl group, ethyl group etc.

Particular examples of such organoaluminum compounds include:

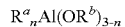 [i]

dimethylaluminum methoxide, diethylaluminum ethoxide, diisobutylaluminum methoxide etc.

 [ii]

Et$_2$Al(OSiMe$_3$)
(iso-Bu)$_2$Al(OSiMe$_3$)
(iso-Bu)-$_2$Al(OSiEt$_3$) etc.

 [iii]

Et$_2$AlOAlEt$_2$
(iso-Bu)$_2$AlOAl(iso-Bu)$_2$ etc.

 [iv]

Me$_2$AlNEt$_2$
Et$_2$AlNHMe
Me$_2$AlNHEt
Et$_2$AlN (Me$_3$Si)$_2$
(iso-Bu)$_2$AlN(Me$_3$Si)$_2$ etc.

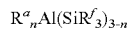 [v]

(iso-Bu)$_2$AlSiMe$_3$ etc.

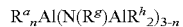 [vi]

Et$_2$AlN(Me)AlEt$_2$
(iso-Bu)$_2$AlN(Et)Al(iso-Bu)$_2$ etc.

In the above formulas, the term Et means an ethyl group, iso-Bu means an isobutyl group, and Me means a methyl group.

Preferable examples of such organoaluminum compounds include organoaluminum compounds represented by $R^a{}_3Al$, $R^a{}_nAl(OR^b)_{3-n}$ and $R^a{}_nAl(OAlR^d{}_2)_{3-n}$.

The alkylated group I metal/aluminum complexes include, for example, compounds represented by the formula $M^1AlR^j{}_4$ wherein $M^1$ is Li, Na or K, and $R^j$ is a $C_{1-15}$ hydrocarbon group, and specifically LiAl(C$_2$H$_5$)$_4$, LiAl (C$_7$H$_{15}$)$_4$ etc. can be mentioned.

The organometallic compound of group II metals include compounds represented by the formula $R^kR^1M^2$ wherein $R^k$ and $R^1$ each represent a $C_{1-15}$hydrocarbon group or a halogen and may be the same or different provided that the two are not simultaneously halogens, and $M^2$ is Mg, Zn or Cd. Specifically, the organometallic compounds include diethylzinc, diethylmagnesium, butylethylmagnesium, ethylmagnesium chloride, and butylmagnesium chloride.

These compounds can be used as a mixture thereof.

The amount of the organometallic compound catalyst component [M] used is described in the item "Process for olefin polymerization" described later.

[Electron Donor (c)]

In the present invention, the above-described electron donors (b) and/or electron donors (c) can be used if necessary with the organometallic compound catalyst component [M]. The electron donor (c) is preferably an organosilicon compound. This organosilicon compound includes, for example, compounds represented by the formula:

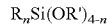

wherein R and R' each represent a hydrocarbon group, and n satisfies the relationship of 0<n<4.

As the organosilicon compounds represented by the above formula, following compounds are exemplified; trimethylmethoxysilane, trimethylethoxysilane, dimethyldimethoxysilane, dimethylidiethoxysilane, diisbpropyldimethoxysilane, t-butylmethyldimethoxysilane, t-butylmethyldiethoxysilane, t-amylmethyldiethoxysilane, phenylmethyldimethoxysilane, dicyclohexyldimethoxysilane, cyclohexylmethyldimethoxysilane, cyclohexylmethyldiethoxysilane, methyltrimethoxysilane, ethyltriethoxysilane, vinyltrimethoxysilane, methyltrimethoxysilane, n-propyltriethoxysilane, methyltriethoxysilane, ethyltriethoxysilane, vinyltriethoxysilane, t-butyltriethoXysilane, phenyltriethoxysilane, chlorotriethoxysilane, vinyltributoxysilane, cyclohexyltrimethoxysilane, cyclohexyltriethoxysilane, trimethylphenoxysilane, vinyltriacetoxysilane, dimethyltetraethoxydisiloxane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane, and cyclopentyldimethylethoxysilane.

Among those preferably used are ethyltriethoxysilane, n-propyltriethoxysilane, t-butyltriethoxysilane, vinyltriethoxysilane, vinyltributoxysilane, diphenyldimethoxysilane, phenylmethyldimethoxysilane, dicyclohexyldimethoxysilane, cyclohexylmethyldimethoxysilane, phenyltriethoxysilane, dicyclopentyldimethoxysilane, hexenyltrimethox-ysilane, cyclopentyltriethoxysilane, tricyclopentylmethoxysilane, and cyclopentyldimethylmethoxysilane.

These organosilicon compounds can be used as a mixture thereof.

When the above-described electron donors (b) and (c) are used if necessary with the organometallic compound catalyst component [M], the amount of the electron donors used is described in the following item "Process for olefin polymerization".

[Process for Olefin Polymerization]

In the process for olefin polymerization according to the present invention, olefin polymerization is carried out using the catalyst for olefin polymerization according to the present invention.

In the process for olefin polymerization according to the present invention, the polymerization can also be carried out in the presence of a prepolymerized catalyst obtained by prepolymerization of α-olefins in the presence of the catalyst for olefin polymerization according to the present invention. This prepolymerization is carried out by prepolymerization of α-olefins in an amount of 0.1 to 1000 g, preferably 0.3 to 500 g, particularly preferably 1 to 200 g, per g of the catalyst for olefin polymerization.

In the prepolymerization, the catalyst can be used at higher concentration than the concentration of the catalyst in the system for the succeeding polymerization.

In the prepolymerization, the concentration of the solid titanium catalyst component [S], in terms of titanium atom per L of liquid medium, is usually in the range of about 0.001 to 200 mmol, preferably about 0.01 to 50 mmol particularly preferably 0.1 to 20 mmol.

The organometallic compound catalyst component [M] in prepolymerization is used preferably in such an amount to form a polymer in an amount of 0.1 to 1000 g, preferably 6.3 to 500 g, per g of the solid titanium catalyst component [S], and the amount of the catalyst component [M] is usually about 0.1 to 300 moles, preferably about 0.5 to 100 moles, particularly preferably 1 to 50 moles, per mole of titanium atom in the solid titanium catalyst component [S].

In the prepolymerization, the electron donor (b) or the electron donor (c) such as an organosilicon compound can also be used if necessary, and these components are used in an amount of 0.1 to 50 moles, preferably. 0.5 to 30,moles, more preferably 1 to 10 moles, per mole of titanium atom in the solid titanium catalyst component [S].

After olefins and the catalyst components are added to an inert hydrocarbon medium, the prepolymerization can be carried out under moderate conditions.

The inert hydrocarbon medium used includes, for example, aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; and halogenated hydrocarbons such as ethylene chloride and chlorobenzene, or mixtures thereof.

Among these inert hydrocarbon mediums aliphatic hydrocarbons are used particularly preferably. When the inert hydrocarbon medium is used, the prepolymerization is carried out preferably in a batch system.

Alternatively, the prepolymerization can be carried out using the olefin itself as solvent or under substantially solvent-free conditions. In this case, the prepolymerization is carried out preferably continuously.

The olefin used in the prepolymerlization is preferably propylene and may be identical with or different from the olefin used in the polymerization described later.

The reaction temperature for prepolymerization is usually in the range of about –20° C. to 100° C., preferably –20° C. to 80° C., more preferably 0 to 40° C.

In the prepolymerization, a molecular weight regulator such as hydrogen can also be used.

The prepolymerization is carried out desirably such that the polymer is formed in an amount of about 0.1 to 1000 g, preferably about 0.3 to 500 g, more preferably 1 to 200 g, per g of the solid titanium catalyst component [S], as described above. When the amount of the polymer formed in the prepolymerization is too high, the efficiency of production of the olefin polymer may be lowered.

The prepolymerization can be carried out in a batch or continuous system.

Now, the polymerization carried out after the prepolymerization or without conducting the prepolymerization is described.

The olefin which can, be used in the polymerization includes ethylene and $C_{3-20}$ α-olefins such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicocene, among which propylene, 1-butene, 1-pentene, 1-hexene, 4-methyl-1-pentene and 1-octene are preferably used.

In the polymerization process of the present invention, these olefins mentioned above can be used alone or as a mixture thereof. The starting materials usable together with ethylene and α-olefins include aromatic vinyl compounds such as styrene and allyl benzene; alicyclic vinyl compounds such as vinylcyclohexane; cyclic olefin such as cyclopentene, cycloheptene, norbornene, tetracyclododecene and compounds having the plural number of unsaturated bonds, for example conjugated or non-conjugated dienes such as, isoprene and butadiene.

In the present invention, the prepolymerization and polymerization can be carried out in either liquid phase polymerization such as solution polymerization and suspension polymerization or gaseous phase polymerization.

When the polymerization is carried but in the reaction form of slurry polymerization, the reaction solvent maybe the inert hydrocarbon used in the prepolymerization or an olefin in a liquid state at the reaction temperature.

In the polymerization process of the present invention, the solid titanium catalyst component [S] is used usually in an amount of about 0.0001 to 0.5 mmol, preferably about 0.005 to 0.1 mmol. Further, the organometallic compound catalyst component [M] is used usually in an amount of about 1 to 2000 moles, preferably about 5 to 500 moles, per mole of titanium atom in the prepolymerized catalyst component in the polymerization system. The electron donor (c) is used in an amount of 0.001 to 50 moles, preferably 0.01 to 30 moles, more preferably 0.05 to 20 moles, per mol of the organometallic compound catalyst component [M].

The molecular weight of the resulting polymer can be regulated by using hydrogen in the polymerization, to give a polymer having a large melt flow rate.

In the polymerization in the present invention, the temperature for polymerization of an olefin is usually about 20 to 100° C., preferably about 50 to 90° C., and the pressure is set usually at atmospheric pressure to 100 kg/cm$^2$, preferably at about 2 to 50 kg/cm$^2$. In the polymerization process of the present invention, the polymerization can be carried out in a batch, semi-continuous or continuous system. Further, the polymerization can also be carried out in two or more steps under different reaction conditions.

The olefinic polymer thus obtained may a homopolymer, a random polymer or a block copolymer.

Polymerization of an olefin, particularly propylene, using the catalyst for olefin polymerization described above gives a propylene polymer having an isotactic index (I.I.) of 70% or more, preferably 85% or more, particularly preferably 95% or more, expressed in terms of residues extracted with boiling heptane.

The polymer has a lower Mw/Mn ratio indicative of molecular-weight distribution determined by gel permeation chromatography (GPC) than that of a polymer obtained by a conventional method, and the polymer having an Mw/Mn ratio of 5 or less is generally obtained in the present invention.

In the present invention, the catalyst for olefin polymerization can contain other components useful for olefin polymerization, in addition to the components described above.

EXAMPLE

Hereinafter, the present invention is described in more detail by reference to the Examples, but the present invention is not limited to the Examples.

In the following examples, the bulk density and melt flow rate of the propylene polymer, and the particle diameter of the solid titanium catalyst component, were measured by the following methods.

(1) Bulk density: Measured according to JIS K-6721.

(2) Melt flowrate (MFR): Measured according to ASTM D1238E (190° C.).

(3) Method of measuring the particle diameter of the solid titanium catalyst component [S]: Analyzed by centrifugal sedimentation using a CAPA-300 particle analyzer manufactured by Horiba, Ltd.

Example 1

(Preparation of Solid Titanium Catalyst Component [S1])

A high-speed stirring unit (Tokushukika Kogyo Co, Ltd.) having an internal volume of 2 L was sufficiently purged with nitrogen and then charged with 700 ml purified kerosine, 10 g commercially available magnesium chloride, 24.2 g ethanol and 3 g Emasol 320™ (sorbitan distearate, manufactured by Kao Atlas) and the temperature of the system was increased under stirring, and the mixture was stirred at 120° C. at 800 rpm for 30 minutes. The reaction mixture under stirring at high speed was transferred through a tube of Teflon (registered trademark) having an inner diameter of 5 mm to a 2-L glass flask (with a stirrer) containing 1 L purified kerosine previously cooled at −10° C. After the purified solid was washed sufficiently with purified n-hexane by filtration, a solid adduct having mole of magnesium chloride coordinated with 2.8 moles of ethanol was obtained.

The whole of the solid adduct, 46.2 mmol in terms of magnesium atom, suspended in 30 ml decane was introduced into 200 ml titanium tetrachloride kept at −20° C. under stirring. This mixture was heated to 80° C. over 5 hours, and when the temperature reached 80° C., 1.9 g diisobutyl phthalate (DIBP) was added thereto, and the mixture was heated to 120° C. over 40 minutes. The mixture was kept at 120° C. for 90 minutes under stirring.

After the reaction for 90 minutes was finished, solids were collected by hot filtration, and the solids were suspended again in 200 ml titanium tetrachloride and heated, and when the temperature reached 130° C., the mixture was maintained under stirring for 45 minutes.

After the reaction was finished, solids were collected again by hot filtration and washed sufficiently with decane and hexane at 100° C. until a free titanium compound was no longer detected in the washing solutions. The sold titanium catalyst component prepared in this manner was stored as decane slurry, and an aliquot thereof was dried for the purpose of examining the catalyst composition.

The composition of the solid titanium catalyst component [S1] thus obtained was comprised of 2.4% by weight of titanium, 20% by weight of magnesium, 7.4% by weight of DIBP and 0.5% by weight of ethanol residues. The particle diameter of the catalyst was 40 μm.

(Preparation of a Prepolymerized Catalyst)

Purified n-hexane, 100 ml, triethylaluminum, 3 mmol, and the solid titanium catalyst component prepared in Example 1, 1.0 mmol in terms of titanium atom, were introduced into a 200 mL four-necked glass reactor equipped with a stirrer, and then propylene was supplied for 1 hour at a rate of 3.2 NL/h into the mixture at 20° C.

After the completion of feeding of propylene, the reactor was purged with nitrogen, and washing comprising removing a supernatant and introducing purified n-hexane was conducted twice, and the resulting prepolymerized catalyst component was suspended again in purified n-hexane, and the whole of the suspension was transferred to a catalyst bottle.

(Polymerization)

500 g propylene and 1 NL of hydrogen were introduced at room temperature to a polymerization reactor with an internal volume of 2 L and then heated, and triethylaluminum, 0.5 mmol, cyclohexylmethyldimethoxysilane (=CMMS), 0.1 mmol, and the prepolymerized catalyst component, 0.004 mmol in terms of titanium atom, were added thereto at 60° C., and the polymerization reactor was kept at 70° C. After the polymerization was carried out for 1 hour, the propylene was purged.

The yield was 23.7 g, and the polymer had an apparent bulk density of 0.48 g/ml, an MFR of 3.9 dg/min., an I.I. of 98.4% and an activity of 59.3 kg-PP/mmol-Ti.

Example 2

The same procedure as in Example 1 was repeated except that as the electron donor (b), 2.3 g of 2-isobutyl-2isopropyl-1,3-dimethoxypropane was used in place of DIBP. The composition of the solid titanium catalyst component thus obtained was comprised of 3.1% by weight of titanium, 18% by weight of magnesium, 14.1% by weight of 2-isobutyl-2-isopropyl-1,3-dimethoxypropane and 0.9% by weight of ethanol residues. The particle diameter of the catalyst was 36 μm.

The same polymerization as in Example 1 was carried out except that the above catalyst was used. The yield was 365 g, and the polymer had an apparent bulk density of 0.44 g/ml, an MRF of 12.0 dg/min., an I.I. of 97.2%, and an activity of 91.1 kg-PP/mmol-Ti.

Example 3

The same procedure as in Example 1 was repeated except that as the electron donor (b), 2.5 g of 2-isobutyl-2-isopentyl-1,3-dimethoxy propane was used in place of DIBP. The composition of the solid titanium catalyst component thus obtained was, comprised of 3.0% by weight of titanium, 17% by weight of magnesium, 13.1% by weight of 2-isopropyl-2-isopentyl-1,3-dimethoxypropane and 0.8% by weight of ethanol residues. The particle diameter of the catalyst was 39 μm.

The same polymerization as in Example 1 was carried out except that the above catalyst was used. The yield was 255 g, and the polymer had an apparent bulk density of 0.43 g/ml, an MRF of 11.0 dg/min., an I.I. of 97.2%, and an activity of 128.0 kg-PP/mmol-Ti.

Example 4

The same procedure as in Example 1was repeated except that in preparing the solid titanium catalyst component, 30 ml toluene was used in place of 30 ml decane. The composition of the solid titanium catalyst component thus obtained was comprised of 2.4% by weight of titanium, 20% by weight of magnesium, 6.3% by weight of DIBP and 0.3% by weight of ethanol residues. The particle diameter of the catalyst was 42 μm.

The same polymerization as in Example 1 was carried out except that the above catalyst was used. The yield was 313 g, and the polymer had an apparent bulk density of 0.45 g/ml, an MRF of 2.5 dg/min., an I.I. of 98.4%, and an activity of 78.3 kg-PP/mmol-Ti.

Example 5

The same procedure as in Example 2 was repeated except that in preparing the solid titanium catalyst component, 30 ml toluene was used in place of 30 ml decane. The composition of the solid titanium catalyst component thus obtained was comprised of 3.2% by weight of titanium, 18% by weight of magnesium, 13.4% by weight of 2-isobutyl-2- isopropyl-1,3-dimethoxypropane and 0.8% by, weight of ethanol residues. The particle diameter of the catalyst was 38 µm.

The same polymerization as, in Example 1 was carried out except that the above catalyst was used. The yield was 157 g, and the polymer had an apparent bulk density of 0.44 g/ml, an MRF of 5.4 dg/min., an I.I. of 98.0%, and an activity of 78.5 kg-PP/mmol-Ti.

Example 6

The same procedure as in Example 1 was repeated except that when the prepolymerized catalyst obtained in Example 1 was used in the polymerization, cyclohexylmethyldimethoxysilane as the electron donor (c) was not used. The yield was 228 g, and the polymer had an apparent bulk density of 0.44 g/ml, an MRF of 14.0 dg/min., an I.I. of 95.0%, and an activity of 114.0 kg-PP/mmol-Ti.

Comparative Example 1

The whole of the solid adduct prepared in Example 1, 46.2 mmol in terms of magnesium atom, was introduced in the solid form into 200 ml titanium tetrachloride kept at −20° C. under stirring. The temperature of this mixed solution was increased over 5 hours to 80° C., and when the temperature reached 80° C., 1.9 g of DIBP was added thereto, and the temperature was increased over 40 minutes to 120° C. The temperature was kept at 120° C. for 90 minutes under stirring.

After the reaction for 90 minutes was finished, solids were collected by hot filtration, and the solids were suspended again in 200 ml titanium tetrachloride and heated, and when the temperature reached 130° C., this temperature was kept for 45 minutes under stirring.

After the reaction was finished, the solids were collected again by hot filtration and washed with decane and hexane at 100° C. until a free titanium compound was no longer detected in the washing solution. The solid titanium catalyst component prepared in this manner was stored as decane slurry, and an aliquot thereof was dried for the purpose of examining the catalyst composition. The composition of the solid titanium catalyst component thus obtained was comprised of 3.2% by weight of titanium, 17% by weight of magnesium, 13.8% by weight of DIBP and 0.5% by weight of ethanol residues. The particle diameter of the catalyst was 40 µm.

The same polymerization as in Example 1 was carried out except that the above catalyst was used. The yield was 163 g, and the polymer had an apparent bulk density of 0.48 g/ml, an MRF of 4.5 dg/min., an I.I. of 98.2%, and an activity of 40.9 kg-PP/mmol-Ti.

Comparative Example 2

The same procedure as in Comparative Example 1 was repeated except that as the electron donor (b), 2.3 g of 2-isobutyl-2-isopropyl-1,3-dimethoxypropane was used in place of DIBP. The composition of the solid titanium catalyst component thus obtained was comprised of 4.1% by weight of titanium, 15% by weight of magnesium, 18.2% by weight of 2-isobutyl-2-isopropyl-1,3-dimethoxypropane and 0.9% by weight of ethanol residues. The particle diameter of the catalyst was 38 µm.

The same polymerization as in Comparative Example 1 was carried out except that the above catalyst was used. The yield was 253 g, and the polymer had an apparent bulk density of 0.43 g/ml, an MRF of 12.0 dg/min., an I.I. of 97.1% and an activity of 63.3 kg-PP/mmol-Ti.

The above results are shown collectively in the following Table 1.

TABLE 1

|  | Inert hydrocarbon solvent | Electron donor (b) | Electron donor (c) | Activity Kg-PP/ mmol-Ti | I.I % | MFR dg/min | Apparent bulk density g/ml |
| --- | --- | --- | --- | --- | --- | --- | --- |
| Example 1 | decane | DIBP[1] | CMMS[4] | 59.3 | 98.4 | 3.9 | 0.48 |
| Example 2 | decane | diether A[2] | CMMS | 91.1 | 97.2 | 12.0 | 0.44 |
| Example 3 | decane | diether B[3] | CMMS | 128.0 | 97.2 | 11.0 | 0.43 |
| Example 4 | toluene | DIBP | CMMS | 78.3 | 98.4 | 2.5 | 0.45 |
| Example 5 | toluene | diether A | CMMS | 78.5 | 97.2 | 5.4 | 0.44 |
| Example 6 | decane | diether A | none | 14.0 | 95.0 | 14.0 | 0.44 |
| Comparative Example 1 | none | DIBP | CMMS | 40.9 | 98 | 4.5 | 0.48 |
| Comparative Example 2 | none | diether A | CMMS | 63.3 | 97.1 | 12.0 | 0.43 |

[1]Diisobutyl Phthalate
[2]2-Isobutyl-2-isopropyl-1,3-dimethoxypropane
[3]2-Isopropyl-2-isopentyl-1,3-dimethoxypropane
[4]Cyclohexylmethyl dimethoxysilane Example 7

(Preparation of Solid Titanium Catalyst Component [S3])

A high-speed stirring unit (Tokushukika Kogyo Co., Ltd.) having an internal volume of 2 L was sufficiently purged with nitrogen and then charged with 700 ml purified kerosine, 10 g commercially available magnesium chloride,: 24.2 g ethanol and 3 g Emasol 320™ (sorbitan distearate, manufactured by Kao Atlas), and the temperature of the system was increased under stirring, and the mixture was stirred at 120° C. at 800 rpm, for 30 minutes. The reaction mixture under stirring at high speed was transferred through a tube made of Teflon (registered trademark) having an inner diameter of 5 mm to a 2-L glass flask (with a stirrer) containing 1 L purified kerosine previously cooled at −10° C. After solids generated were washed sufficiently with purified n-hexane by filtration, a solid adduct having 1 mole of magnesium chloride coordinated with 2.8 moles of ethanol was obtained.

The whole of the solid adduct, 46.2 mmol in terms of magnesium atom, suspended in 30 ml decane was introduced into 200 ml titanium tetrachloride kept at −20° C. under stirring. This mixture was heated to 80° C. over 5 hours, and when 80° C. was reached, 1.4 g 2-isobutyl-2-isopropyl-1,3-dimethoxypropane was added thereto, and the mixture was heated to 120° C. over 40 minutes. The mixture was kept at 120° C. for 90 minutes under stirring.

After the reaction for 90 minutes was finished, solids were collected by hot filtration, and the solids were suspended again in 200 ml titanium tetrachloride and heated, and when the temperature reached 130° C., 0.9 g of 2-isobutyl-2-isopropyl-1,3-dimethoxypropane was added thereto, and the mixture was maintained at 130° C. for 45 minutes under stirring.

After the reaction for 45 minutes was finished, solids were collected again by hot filtration, and the solids were suspended again in 200 ml titanium tetrachloride and heated, and when the temperature reached 130° C., the mixture was kept at this temperature for 45 minutes under stirring. After the reaction finished, solids were collected again by hot filtration and washed sufficiently with decane and hexane at 100° C. until a free titanium compound was no longer detected in the washing solution. The sold titanium catalyst component prepared in this manner was stored as decane slurry, and an aliquot thereof was dried for the purpose of examining the catalyst composition.

The composition of the solid titanium catalyst component [S3] thus obtained was comprised of 2.7% by weight of titanium, 19% by weight of magnesium, 14.2% by weight of 2-isobutyl-2-isopropyl-1,3-dimethoxypropane and 0.2% by weight of ethanol residues. The particle diameter of the catalyst was 38 μm.

(Polymerization)

500 g of propylene and 1 NL of hydrogen were introduced at room temperature into a polymerization reactor with an internal volume of 2 L, and then triethylaluminum, 0.5 mmol, cyclohexylmethyldimethoxysilane, 0.1 mmol, and the solid titanium catalyst component [S3], 0.004 mmol in terms of titanium atom, were added thereto, and the polymerizer was rapidly heated to 70° C. After the polymerization was carried out at 70° C. for 1 hour, the reaction was terminated by a small amount of methanol, and the propylene was purged.

The yield was 446 g, and the polymer had an apparent bulk density of 0.43 g/ml, an MRF of 10.5 dg/min, an I.I. of 97.3%, and an activity of 112.0 kg-PP/mmol-Ti.

Example 8

(Preparation of Solid Titanium Catalyst Component [S3])

A catalyst was prepared in the same manner as in Example 7 except that the solid adduct, 54 mmol in terms of magnesium atom, was used.

(Polymerization)

The polymerization of propylene was carried out in the same manner as in Example 7 except for use of, the catalyst. The yield was 508 g, and the polymer had an apparent bulk density of 0.43 g/ml, an MRF of 11.0 dg/min., an I.I. of 97.3%, and an activity of 127.0 kg-PP/mmol-Ti.

Example 9

(Preparation of Solid Titanium Catalyst Component [S2])

A solid titanium catalyst component was prepared in the same manner as in Example 7 except that in preparing the solid titanium catalyst component in Example 7, decane was not used.

(Polymerization)

The polymerization of propylene was carried out in the same manner as in Example 7 except for use of the catalyst. The yield was 154 g, and the polymer had an apparent bulk density of 0.42 g/ml, an MRF of 10.0 dg/min, an I.I. of 97.3%, and an activity of 77.2 kg-PP/mmol-Ti.

Comparative Example 3

The whole of the solid adduct prepared in Example 7, 46.2 mmol in terms of magnesium atom, suspended in 30 ml decane was introduced into 200 ml titanium tetrachloride kept at −20° C. under stirring. This mixture was heated to 80° C. over 5 hours, and when 80° C. was reached, 2.3 g of 2-isobutyl-2-isopropyl-1,3-dimethoxypropane was added thereto, and the mixture was heated to 120° C. over 40 minutes. The mixture was kept at 120° C. for 90 minutes under stirring.

After the reaction for 90 minutes was finished, solids were collected by hot filtration, and the solids were suspended again in 200 ml titanium tetrachloride and heated, and when 130° C. was reached, the mixture was maintained at this temperature for 45 minutes under stirring. After the reaction was finished, solids were collected again by hot filtration and washed sufficiently with decane and hexane at 100° C. until a free titanium compound was no longer detected in the washing solution.

The sold titanium catalyst component prepared in this manner was stored as decane slurry, and an aliquot thereof was dried for the purpose of examining the catalyst composition.

The composition of the solid titanium catalyst component thus obtained was comprised of 2.7% by weight of titanium, 18% by weight of magnesium, 15.6% by weight of 2-isobutyl-2,-isopropyl-1,3-dimethoxypropane and 0.7% by weight of ethanol residues. The particle diameter of the catalyst was 38 μm.

(Polymerization)

The polymerization of propylene was carried out in the same manner as in Example 7 except for use of the catalyst. The yield was 341 g, and the polymer had an apparent bulk density of 0.4 g/ml, an MRF of 11.5 dg/min., an I.I. of 97.2%, and an activity of 85.1 kg-PP/mmol-Ti.

Example 10

(Preparation of a Prepolymerized Catalyst)

Purified n-hexane, 100 ml, triethylaluminum, 3 mmol, and the solid titanium catalyst component [S2] prepared in Example 7, 1.0 mmol in terms of titanium atom, were introduced into a 200 mL four necked glass reactor equipped with a stirrer in a nitrogen atmosphere, and then propylene was supplied for 1 hour at a rate of 3.2 NL/h into the mixture at 20° C.

After the completion of feeding of propylene, the reactor was purged with nitrogen, and washing comprising removing a supernatant and introducing purified n-hexane was conducted twice, and the resulting prepolymerization catalyst component was suspended again in purified hexane, and the whole of the suspension was transferred to a catalyst bottle.

(Polymerization)

500 g of propylene and 1 NL of hydrogen were introduced at room temperature to a polymerization reactor with an internal volume of 2 L and then heated to 60° C., and triethylaluminum, 0.5 mmol, cyclohexylmethyldimethoxysilane, 0.1 mmol, and the prepolymerization catalyst component, 0.004 mmol in terms of titanium atom, were added thereto, and the polymerizer was rapidly heated to 70° C. After the polymerization was carried out at 70° C. for 1 hour, the reaction was terminated by a small amount of methanol, and the propylene was purged. The yield was 298 g, and the polymer had an apparent bulk density of 0.46 g/ml, an MFR of 11.0 dg/min., an I.I. of 97.4%, and an activity of 74.6 kg-PP/mmol-Ti.

The above results are shown collectively in Table 2.

TABLE 2

| | Number the materials were contacted | Inert hydro-carbon solvent | Activity Kg-PP/ mmol-Ti | I.I % | MFR dg/ min | Apparent bulk density g/ml |
|---|---|---|---|---|---|---|
| Example 7 | 2 | Decane | 112.0 | 97.3 | 10.5 | 0.43 |
| Example 8 | 2 | Decane | 127.0 | 97.3 | 11.0 | 0.43 |
| Example 9 | 2 | None | 77.2 | 97.3 | 10.0 | 0.42 |
| Comparative Example 3 | 1 | Decane | 85.1 | 97.2 | 11.5 | 0.40 |
| Example 10[1)] | 2 | Decane | 74.6 | 97.4 | 11.0 | 0.46 |

[1)]Polymerization system using the prepolymerized catalyst.

As described above, the solid titanium catalyst component [S] of the present invention can be used to obtain a catalyst for olefin polymerization having a higher catalytic activity and giving a polymer having high stereospecificity, without using an electron donor at the time of polymerization. By simultaneously using the electron donor (c) at the time of polymerization, a catalyst for olefin polymerization having a further higher catalytic activity and giving a polymer having high stereospecificity can be produced.

The catalyst for olefin polymerization according to the present invention comprises the solid titanium catalyst [S] and an organometallic compound catalyst component [M] containing a metal selected from the groups I to III in the periodic table, and the olefin polymerization process of the present invention comprises polymerization or copolymerization of a monomer selected from α-olefins by using the catalyst for olefin polymerization. Accordingly, the catalyst for olefin polymerization and the olefin polymerization process according to the present invention, polymerization reaction can be carried out highly efficiently with a high catalytic activity to give a polymer having high stereospecificity.

The invention claimed is:

1. A solid titanium catalyst component for olefin polymerization, said catalyst comprising titanium, magnesium, halogen, and an electron donor (b), which catalyst is obtained by bringing a solid adduct consisting of a magnesium compound and an electron donor (a) into contact with an electron donor (b) and a liquid titanium compound at one time or plural times in divided portions by contacting the components of the catalyst suspended in an inert hydrocarbon solvent.

2. A solid titanium catalyst component for olefin polymerization, said catalyst comprising titanium, magnesium, halogen, and an electron donor (b), which catalyst is obtained by bringing a solid adduct consisting of a magnesium compound and an electron donor (a) into contact with an electron donor (b) and a liquid titanium plural times in divided portions by contacting the components of the catalyst suspended without an inert hydrocarbon solvent.

3. The solid titanium catalyst component of claim 1, wherein said inert hydrocarbon solvent is an aliphatic hydrocarbon, an alicyclic hydrocarbon, an aromatic hydrocarbon, a halogenated hydrocarbon, or a mixture thereof.

4. The solid titanium catalyst component of claim 1, wherein said inert hydrocarbon solvent is toluene.

5. The solid titanium catalyst component for olefin polymerization according to claim 1 or claim 2, wherein the electron donor (b) is a compound having two or more ether linkages.

6. The solid titanium catalyst component for olefin polymerization according to claim 1 or claim 2, whose particle diameter is 30 to 150 μm.

7. A catalyst for olefin polymerization, comprising the solid titanium catalyst component for olefin polymerization described in claim 1 or claim 2 and an organometallic compound catalyst component containing a metal selected from the groups 1 to 3 in the periodic table.

8. A process for olefin polymerization, which comprises polymerizing at least one olefin selected from the group consisting of ethylene and $C_{3-20}$ α-olefins by using the catalyst for olefin polymerization described in claim 1 or claim 2.

* * * * *